(12) United States Patent
Gorzynski et al.

(10) Patent No.: US 9,445,052 B2
(45) Date of Patent: Sep. 13, 2016

(54) DEFINING A LAYOUT FOR DISPLAYING IMAGES

(75) Inventors: Mark E. Gorzynski, Corvallis, OR (US); Michael D. Derocher, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1331 days.

(21) Appl. No.: 13/222,429

(22) Filed: Aug. 31, 2011

(65) Prior Publication Data
US 2013/0050399 A1 Feb. 28, 2013

(51) Int. Cl.
*H04N 5/46* (2006.01)
*H04N 7/15* (2006.01)
*H04N 7/14* (2006.01)

(52) U.S. Cl.
CPC .............. *H04N 7/152* (2013.01); *H04N 7/142* (2013.01)

(58) Field of Classification Search
USPC ............................... 348/14.01, 14.02, 14.08
See application file for complete search history.

(56) References Cited

U.S. PATENT DOCUMENTS

| 8,213,737 | B2 * | 7/2012 | Steinberg et al. ............ 382/275 |
| 2008/0100696 | A1 * | 5/2008 | Schirdewahn ......... H04N 7/152 348/14.09 |
| 2010/0128105 | A1 | 5/2010 | Halavy |
| 2010/0302446 | A1 * | 12/2010 | Mauchly ............... H04N 7/147 348/598 |

FOREIGN PATENT DOCUMENTS

| JP | 2009089324 A | 4/2009 |
| JP | 2010213155 A | 9/2010 |
| WO | WO 2010002925 A2 * | 1/2010 ............. H04N 7/147 |

OTHER PUBLICATIONS

Peng, et at; "RASL: Robust Alignment by Sparse and Low-rank Decomposition for Linearly Correlated Images", http://perception.csl.uiuc.edu/matrix-rank/Files/RASL_PAMI.pdf, Apr. 14, 2011.

* cited by examiner

*Primary Examiner* — Duc Nguyen
*Assistant Examiner* — Assad Mohammed
(74) *Attorney, Agent, or Firm* — HP Inc Patent Department

(57) ABSTRACT

Metadata associated with a first image and that specifies an alignment reference line for the first image is accessed. Based on the accessed metadata associated with the first image, a layout for concurrently displaying the first image and a second image at a location is defined that substantially aligns the alignment reference line of the first image with an aspect of the second image.

18 Claims, 6 Drawing Sheets

DEFINING A LAYOUT FOR DISPLAYING IMAGES

BACKGROUND

A videoconference typically involves an exchange of video streams that enable participants to see one another. Sometimes, these video streams may exhibit different characteristics. For example, a videoconference may involve some participants participating from personal computers (e.g., desktop or laptop computers) for whom video streams are captured by webcams and other participants participating from more controlled videoconference environments like dedicated videoconference studios for whom video streams are captured by controlled and relatively sophisticated video cameras.

DETAILED DESCRIPTION

Figure 1A:
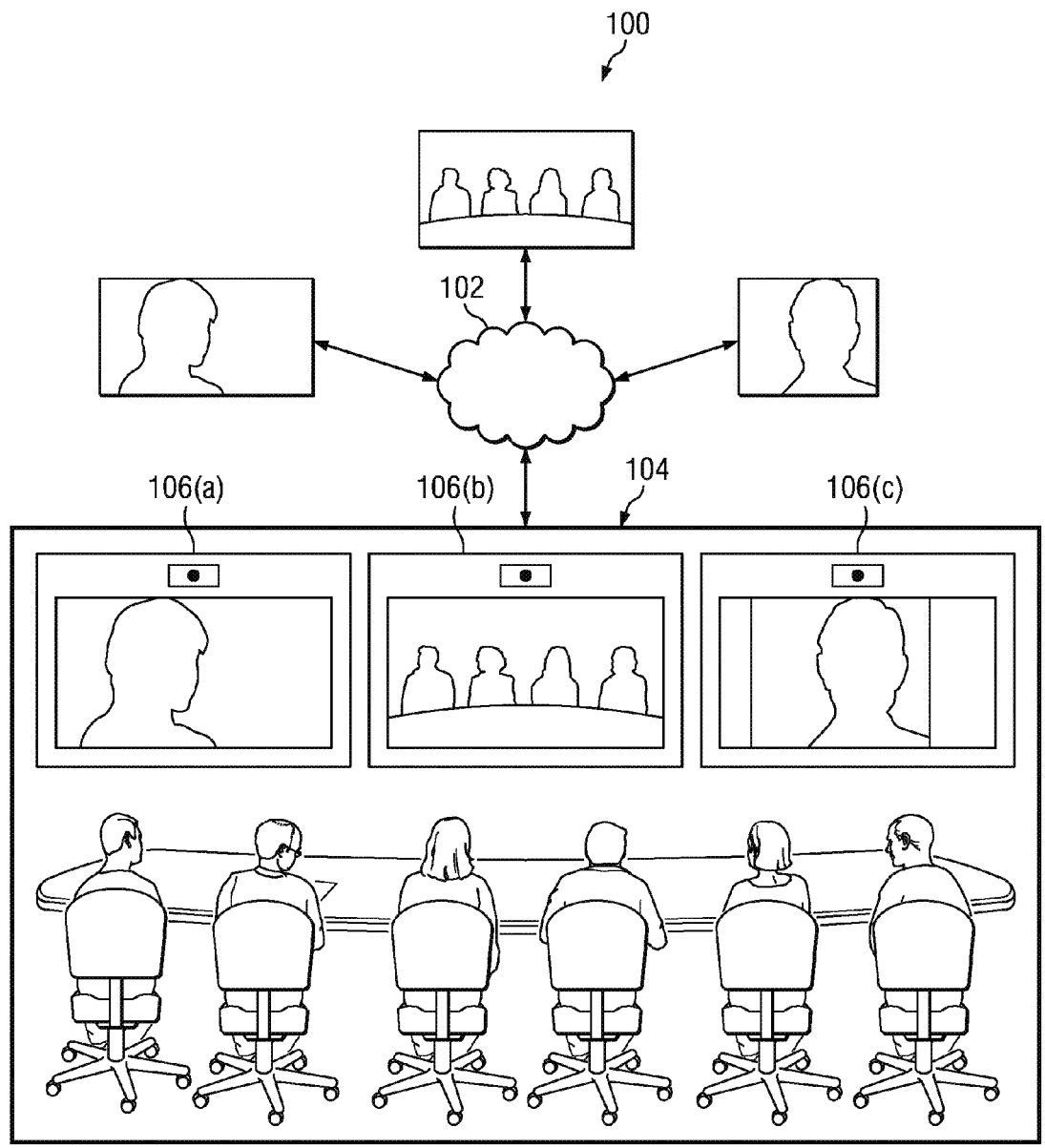
FIGS. 1A-1D and 4 are schematic diagrams that illustrate examples of different layouts for concurrently displaying multiple video images.

FIG. 1A is a schematic diagram of a multipoint videoconference 100. As illustrated in FIG. 1A, the videoconference 100 includes participants participating in the videoconference 100 from four different locations via electronic devices that are communicatively coupled by a network 102. In the foreground, participants are shown participating in the videoconference 100 from a dedicated videoconference studio 104 having three display devices 106(a)-106(c) on which streams of video images of the other participants in the videoconference 100 are displayed. Display devices 106(a) and 106(c) are displaying streams of video images of individual participants, for example captured by webcams or similar relatively uncontrolled video cameras. Meanwhile, display device 106(b) is displaying a stream of video images of a group of participants gathered at a dedicated videoconference studio similar to videoconference studio 104, for example captured by a controlled and relatively sophisticated video camera. In addition, streams of video images displayed on display devices 106(a) and 106(b) have substantially the same aspect ratios, whereas the aspect ratio of the stream of video images displayed on display device 106(c) is different from the aspect ratios of the streams of video images displayed on display devices 106(a) and 106(b).

Figure 1B:
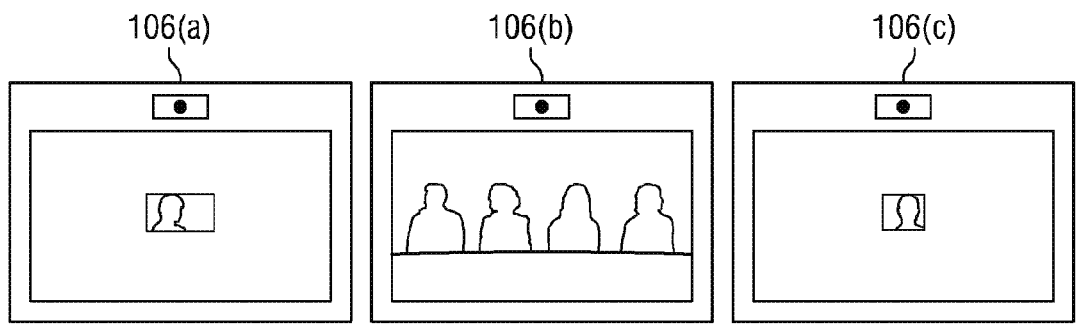

As illustrated in FIG. 1A, the video images displayed by display devices 106(a)-106(c) are displayed at the maximum scale available while preserving their full extents and aspect ratios. The resulting visual presentation of the remote participants on display devices 106(a)-106(c) in dedicated videoconference studio 104, with the scale of the individual participants in the video images displayed on display devices 106(a) and 106(c) being far greater than the scale of the group of participants in the video images displayed on display device 106(b), may be considered distorted or distracting by some observers, particularly those expecting the visual presentation to provide the illusion that the remote participants are seated with them at the same table and in the same room. Referring now to FIG. 1B, the resulting visual presentation of the remote participants on display devices 106(a)-106(c) in dedicated videoconference studio 104 may not be any more appealing even when the scale of the individual participants in the video images displayed on display devices 106(a) and 106(c) is decreased to be more in line with the scale of the group of participants in the video images displayed on display device 106(b).

In multipoint videoconferences involving streams of video images having different characteristics (e.g., scale, extent, etc.) such as the multipoint videoconference 100 illustrated in FIG. 1A, different techniques for displaying the streams of video images may be employed to provide a visual presentation of the streams of video images that observers find to be natural. For instance, referring to FIGS. 1C and 1D, in one specific example, where a videoconference involves both a stream of video images of participants in a controlled environment (e.g., a dedicated videoconference studio) captured by a controlled video camera as well as streams of video images of other participants participating from uncontrolled environments captured by uncontrolled video cameras (e.g., webcams), alignment reference lines 108 and 110 are established within the video images of the stream of video images of participants in the controlled environment corresponding to an approximate head height of the participants and an approximate table height, respectively, and the top edges 112 of the streams of video images of the participants participating from uncontrolled environments captured by uncontrolled video cameras are aligned with the reference line 108 corresponding to the approximate head height of the participants participating from the controlled environment, and the bottom edges 114 of the streams of video images of the participants participating from uncontrolled environments captured by uncontrolled video cameras are aligned with the reference line 110 corresponding to the approximate table height. The resulting visual presentation of the streams of video images of the videoconference participants may be perceived as quite natural to many observers despite the different characteristics of the streams of video images.

The alignment reference lines 108 and 110 may be used to align streams of video images of the participants participating from uncontrolled environments even when the scale of the stream of video images of participants in the controlled environment is modified. For example, comparing FIG. 1C to 1D, when the stream of video images of participants in the controlled environment is zoomed in, increasing the scale of the stream of video images of the participants in the controlled environment, the alignment reference lines 108 and 110 are maintained at their same relative positions within the stream of video images (i.e., at the approximate head height and table height, respectively), and the streams of video images of the participants participating from uncontrolled environments captured by uncontrolled video cameras are rescaled so as to maintain the alignment of the top edges 112 of the streams of video images of the participants in the uncontrolled environment captured by uncontrolled cameras with the alignment reference line 108 corresponding to the approximate head height of the participants participating from the controlled environment and the alignment of the bottom edges 114 of the streams of video images of the participants participating from uncontrolled environments captured by uncontrolled video cameras with the reference line 110 corresponding to the approximate table height. In some implementations, as illustrated in FIGS. 1C and 1D, an image of a virtual table 116 may be overlaid on displays of the streams of video images of the participants participating from uncontrolled environments to further the illusion that all of the remote participants are seated at the same table.

Figure 1C:
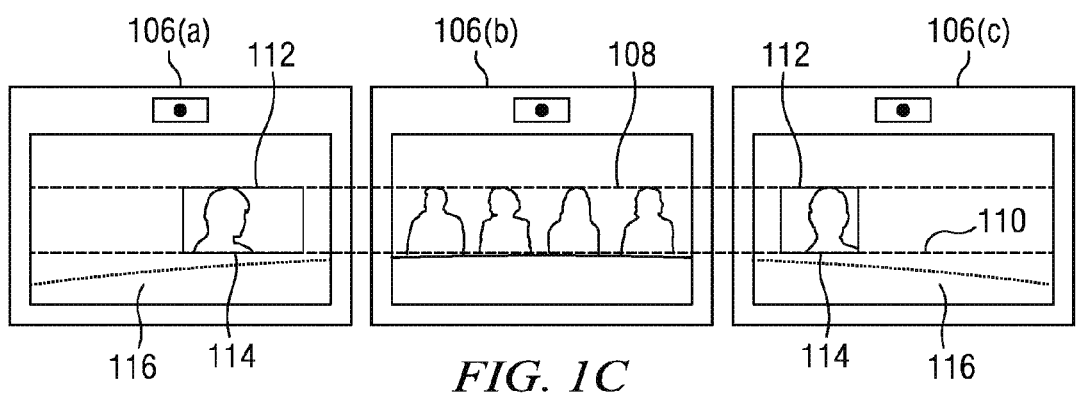
Figure 1D:
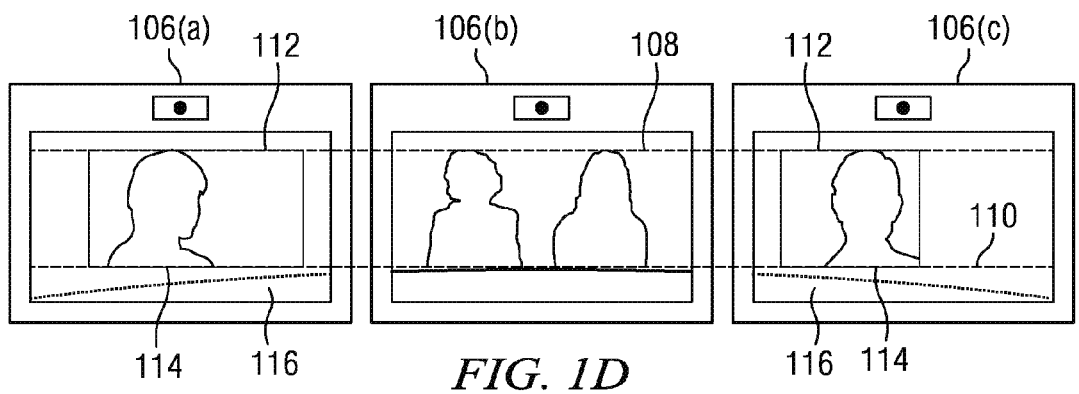

As illustrated in FIGS. 1C and 1D, the resulting visual presentation when the alignment reference lines 108 and 110 of the stream of video images of the participants participating from the controlled environment are used to align the top 112 and bottom edges 114 of the streams of video images of the participants participating from uncontrolled environments may be perceived as relatively natural by some observers even though the scale of the display of the stream of video images of the participants participating from the controlled environment is different from the scales of the displays of the streams of video images of the participants participating from the uncontrolled environments. Similarly, the resulting visual presentation may be perceived as natural by some observers even though the size of the display of the stream of video images of the participants participating from the controlled environment is different from the sizes of the displays of the streams of video images of the participants participating from the uncontrolled environments and the displays of the streams of video images of the participants participating from the uncontrolled environments do not occupy all of the screen real estate provided by display devices 106(a) and 106(c).

As also illustrated in FIGS. 1C and 1D, when the alignment reference lines 108 and 110 of the stream of video images of the participants participating from the controlled environment are used to align the top 112 and bottom edges 114 of the streams of video images of the participants participating from uncontrolled environments, the aspect ratios of all of the streams of video images may be maintained. Consequently, the aspect ratios of the streams of video images displayed on display devices 106(a) and 106(b) may be substantially the same even though the scale and/or size of the streams of video images displayed on display devices 106(a) and 106(b) may be different. Moreover, the resulting visual presentation may be perceived as natural by some observers even though the aspect ratios of the streams of video images displayed on display devices 106(a) and 106(b) are different than the aspect ratio of the streams of video images displayed on display device 106(c).

As further illustrated in FIGS. 1C and 1D, the displays of the streams of video images of the participants participating from uncontrolled environments displayed on display devices 106(a) and 106(c) both may be shifted horizontally toward the display of the stream of video images of the participants participating from the controlled environment displayed on display device 106(b). That is to say, the displays of the streams of video images of the participants participating from uncontrolled environments displayed on display devices 106(a) and 106(c) both may be off-center and horizontally biased toward the display of the stream of video images of the participants participating from the controlled environment displayed on display device 106(b).

Figure 2A:
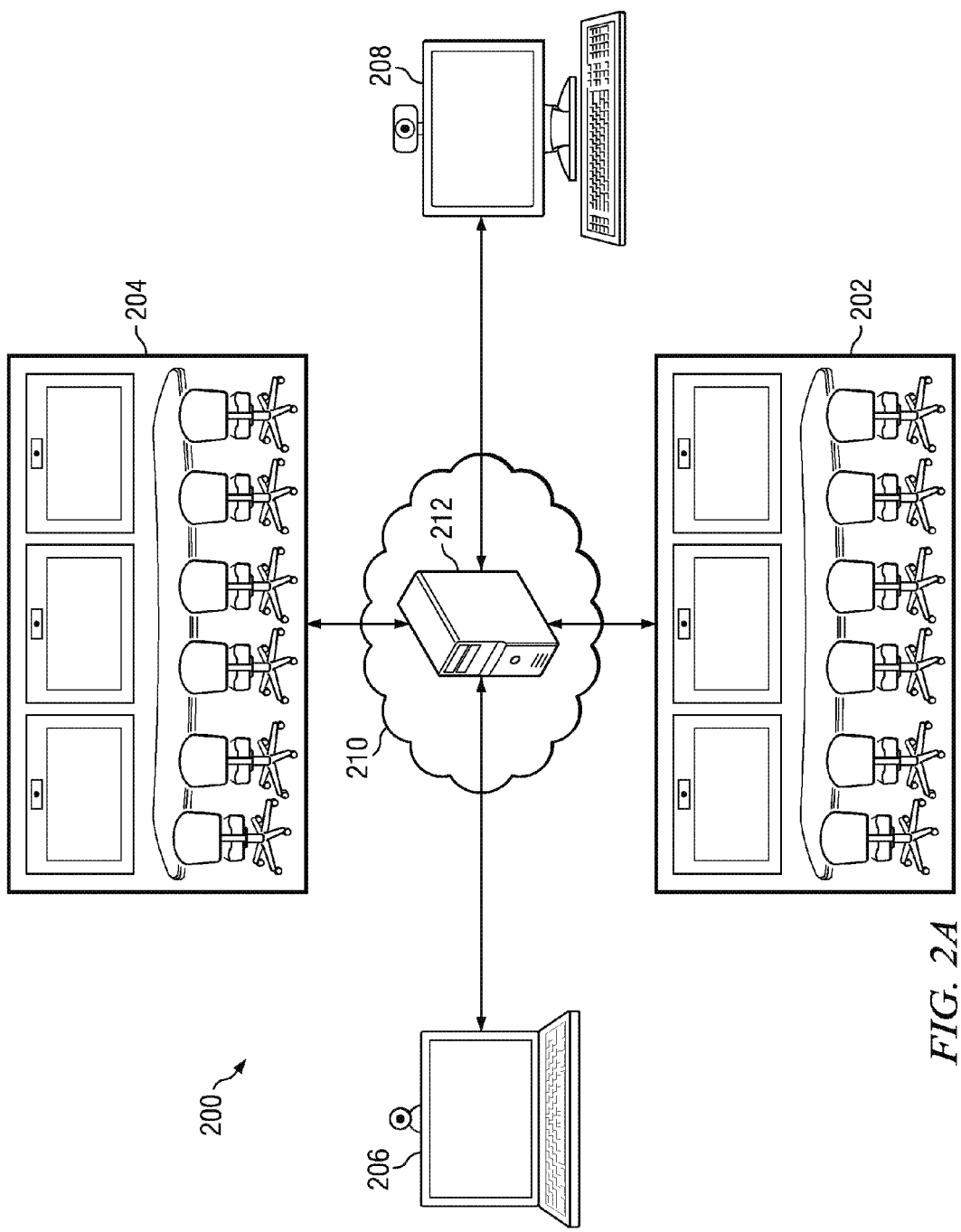
FIGS. 2A and 2B are block diagrams of examples of multipoint videoconference architectures.
Figure 2B:
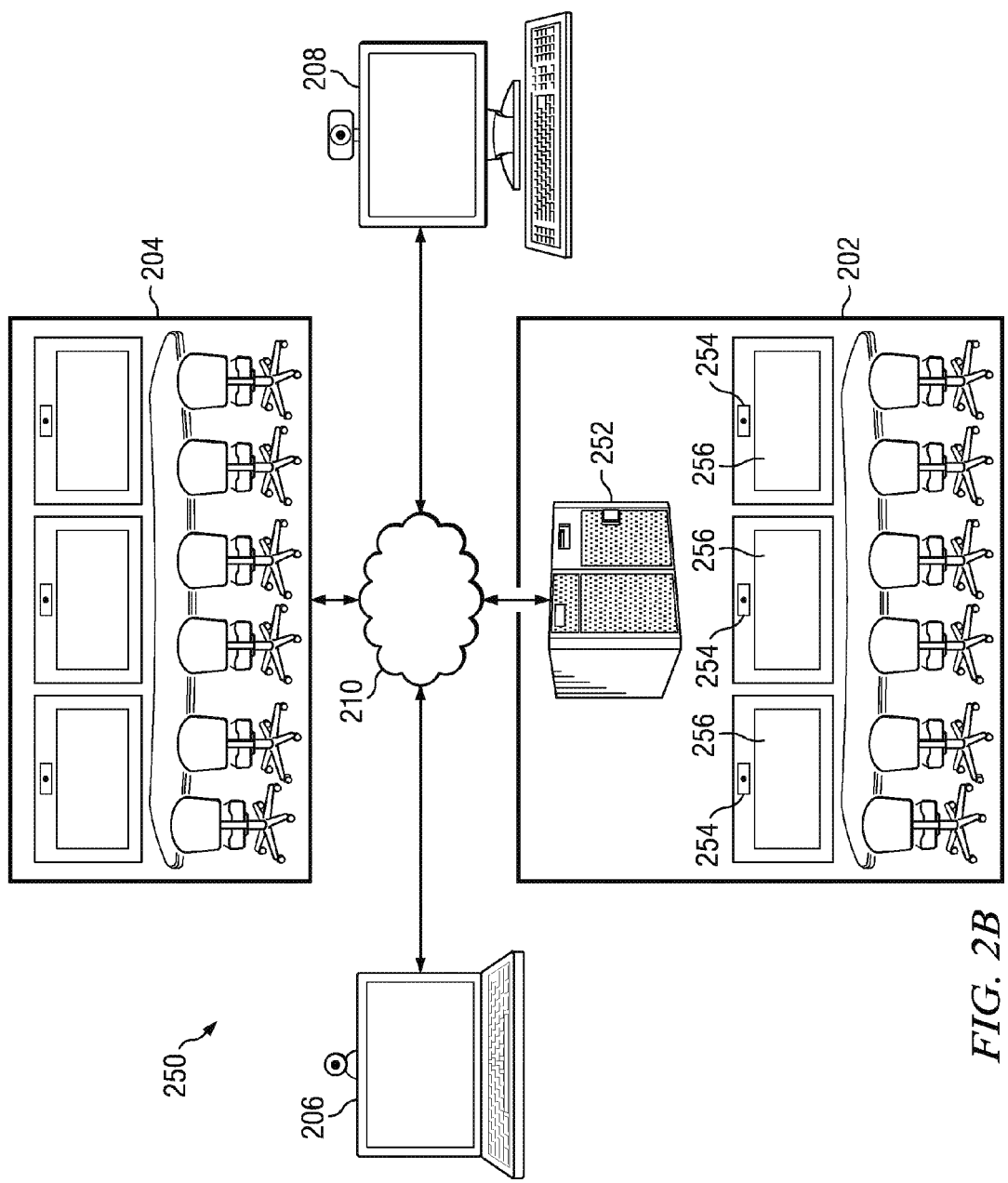

FIGS. 2A and 2B are block diagrams of examples of different multipoint videoconference architectures 200 and 250, respectively. Each videoconference architecture 200 and 250 includes two dedicated videoconference studios 202 and 204 having appropriate equipment for capturing and transmitting outbound videoconference video and audio streams and receiving and rendering inbound videoconference video and audio streams, a laptop computer 206, and a desktop computer 208 that all are communicatively coupled by a network 210 over which videoconference video and audio streams may be exchanged, thereby enabling participants located at dedicated videoconference studios 202 and 204, laptop computer 206, and desktop computer 208 to participate in a videoconference.

As illustrated in FIG. 2A, architecture 200 includes a centralized videoconference management computer system 212 (e.g., a multi-point control unit (MCU) and/or other control system) that is remote from each of dedicated videoconference studios 202 and 204, laptop computer 206, and desktop computer 208. Among other features, centralized videoconference management computer system 212 may receive outbound videoconference video and audio streams from each of dedicated videoconference studios 202 and 204, laptop computer 206, and desktop computer 208, and coordinate the distribution of the appropriate inbound videoconference video and audio streams to each of dedicated videoconference studios 202 and 204, laptop computer 206, and desktop computer 208.

As part of such distribution of videoconference video and audio streams, centralized videoconference management computer system 212 may define layouts for displaying the inbound videoconference video streams at one or more of dedicated videoconference studios 202 and 204, laptop computer 206, and desktop computer 208, for example, according to the techniques for defining layouts for displaying images described herein. Displaying inbound videoconference video streams at dedicated videoconference studios 202 and 204, laptop computer 206, and/or desktop computer 208 according to layouts defined using such techniques may result in visual presentations of the inbound video streams that appear natural to the videoconference participants despite the fact that some of the participants are participating from the relatively controlled environments of dedicated videoconference studios 202 and 204 while other of the participants are participating from the relatively uncontrolled environments of laptop computer 206 and desktop computer 208.

Centralized videoconference management computer system 212 may be any of a number of different types of computing systems including, for example, a server, a router, a switch, a personal computer, a special purpose computer, a general purpose computer, a combination of a special purpose and a general purpose computing device, a laptop computer, a tablet computer, a netbook computer, a smart phone, a mobile phone, a personal digital assistant, a portable media player, any combination thereof, etc. Furthermore, centralized videoconference management computer system 212 may have internal or external storage components for storing data and programs such as an operating system and one or more application programs as well as a central processing unit (CPU) for executing instructions stored in storage and/or received from one or more other electronic devices, for example over network 210. As one example, a layout engine for defining layouts for displaying videoconference video streams distributed by centralized videoconference management computer system 212 to one or more of dedicated videoconference studios 202 and 204, laptop computer 206, and desktop computer 208 may be implemented as an application program executed by a CPU. In addition, centralized videoconference management computer system 212 also may include one or more communication devices for sending and receiving data (e.g., a modem, an antenna, a transceiver, a communications card, and/or any other type of network adapter capable of transmitting and receiving data over network 210 through a wired or wireless data pathway).

Unlike the multipoint videoconference architecture 200 illustrated in FIG. 2A, the multipoint videoconference architecture 250 illustrated in FIG. 2B does not include a centralized videoconference management computer system. Instead, in the multipoint videoconference architecture 250 of FIG. 2B, the functions of the centralized videoconference management computer system 212 of FIG. 2A may be distributed across computing devices located at one or more of dedicated videoconference studios 202 and 204, laptop computer 206, and desktop computer 208, and, in some cases, videoconferences conducted using multipoint videoconference architecture 250 may be executed as peer-to-peer videoconferences.

As illustrated in FIG. 2B, a local videoconference management computer system 252 is located locally to dedicated videoconference studio 202 (e.g., within local videoconference studio 202). Among other features, local videoconference management computer system 252 may receive outbound videoconference video and audio streams from video cameras 254 and microphones (not shown) located in dedicated videoconference studio 202) and coordinate the distribution of such outbound videoconference video and audio streams to one or more of dedicated videoconference studio 204, laptop computer 206, and desktop computer 208. In addition, local videoconference management computer system 252 also may receive inbound videoconference video and audio streams from one or more of dedicated videoconference studio 204, laptop computer 206, and desktop computer 208 and coordinate the visual and audio rendering of such inbound videoconference video and audio streams at dedicated videoconference studio 202.

As part of such visual rendering of inbound videoconference video streams, local videoconference management computer system 252 may define layouts for displaying the inbound videoconference video streams on the display devices 256 located at dedicated videoconference studio 202, for example, according to the techniques for defining layouts for displaying images described herein. Displaying inbound videoconference video streams at dedicated videoconference studio 202 according to layouts defined using such techniques may result in a visual presentation of the inbound video streams on the display devices 256 at dedicated videoconference studio 202 that appears natural to the videoconference participants participating from dedicated videoconference studio 202 despite the fact that the other participants are participating from a laptop computer 206, a dedicated videoconference studio 204, and a desktop computer 208.

Local videoconference management computer system 252 may be any of a number of different types of computing systems including, for example, a server, a router, a switch, a personal computer, a special purpose computer, a general purpose computer, a combination of a special purpose and a general purpose computing device, a laptop computer, a tablet computer, a netbook computer, a smart phone, a mobile phone, a personal digital assistant, a portable media player, any combination thereof, etc. Furthermore, local videoconference management computer system 252 may have internal or external storage components for storing data and programs such as an operating system and one or more application programs as well as a central processing unit (CPU) for executing instructions stored in storage and/or received from one or more other electronic devices, for example over network 210. As one example, a layout engine for defining layouts for displaying inbound videoconference video streams received by local videoconference management computer system 252 may be implemented as an application program executed by a CPU. In addition, local videoconference management computer system 252 also may include one or more communication devices for sending and receiving data (e.g., a modem, an antenna, a transceiver, a communications card, and/or any other type of network adapter capable of transmitting and receiving data over network 210 through a wired or wireless data pathway).

Figures 3, 5:
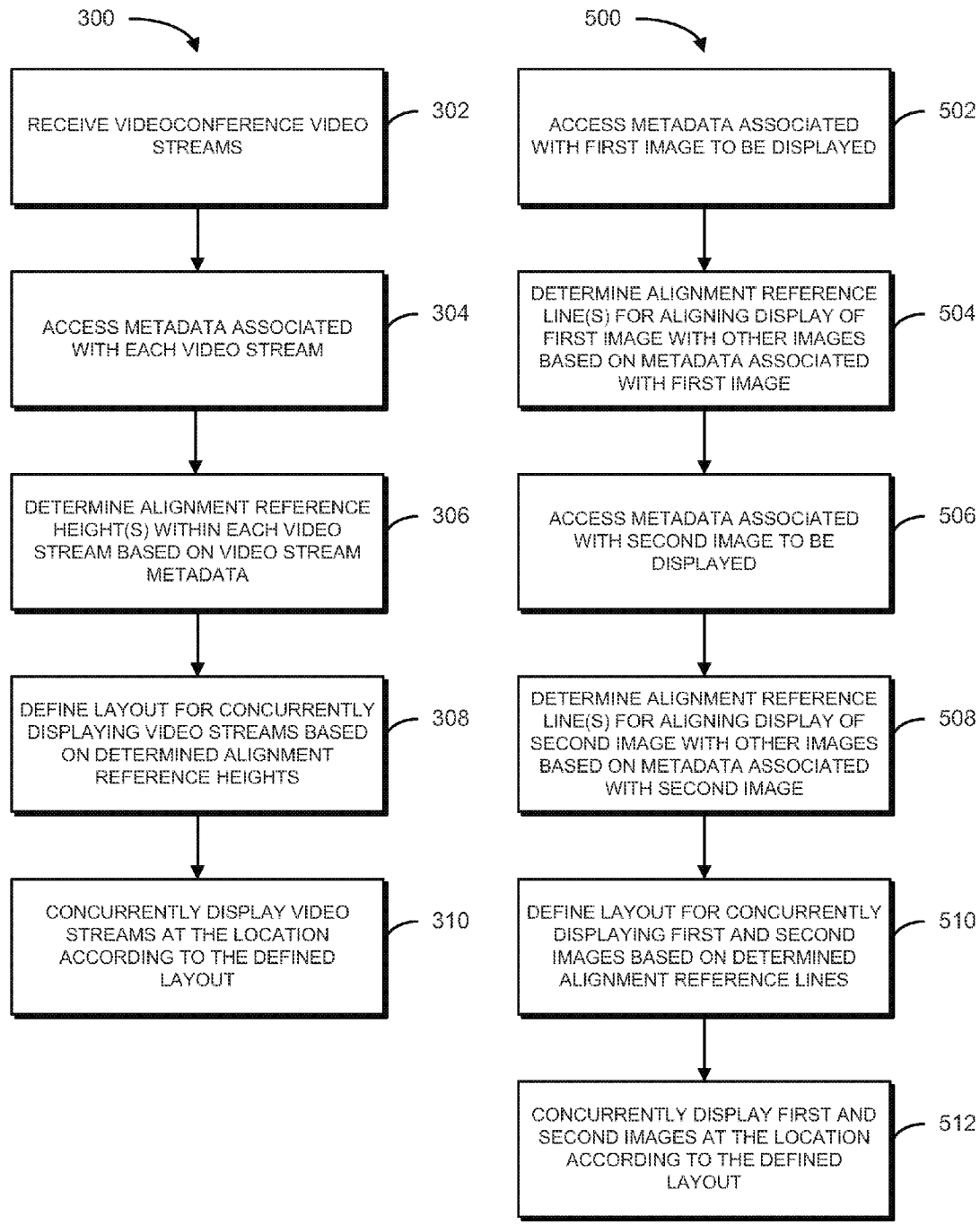
FIGS. 3 and 5 are flowcharts that illustrate examples of processes for defining layouts for displaying multiple images concurrently.

FIG. 3 is a flowchart 300 that illustrates an example of a process for defining a layout for displaying multiple videoconference video streams concurrently at a location (e.g., in a dedicated videoconference studio, on a laptop computer, or on a display device associated with a desktop computer). The process illustrated in the flowchart 300 of FIG. 3 may be performed by a computing system, such as, for example, centralized videoconference management computer system 212 of FIG. 2A or local videoconference management computer system 252 of FIG. 2B.

At 302, videoconference video streams are received. For example, a first videoconference video stream may be received from a first videoconference participant location and a second videoconference video stream may be received from a second videoconference participant location.

At 304, metadata associated with each received video stream is accessed. For instance, in some implementations, a video stream may have associated metadata describing certain characteristics of the video stream including, for example, one or more reference heights within images of the video stream to be used to align the images of the video stream with images of other video streams. In one particular implementation, videoconference video streams originating from relatively controlled environments, such as, for example, dedicated videoconference studios, may have metadata specifying one or more reference heights (e.g., an approximate head height and/or an approximate table height) to be used to align the images of the video streams with images from other video streams, while metadata associated with videoconference video streams originating from relatively uncontrolled environments, such as, for example, laptop or desktop computers equipped with webcams, may not specify any reference heights to be used to align the images of the video streams with images from other video streams. Alternatively, metadata associated with videoconference video streams originating from relatively uncontrolled environments (e.g., laptop or desktop computers equipped with webcams) may specify that the top and/or bottom edges of the images of the video streams are to be used to align the images of the video streams with images from other video streams.

At 306, one or more alignment reference heights are determined within the images of each received video stream based on the video stream metadata accessed for each received video stream, and, at 308, a layout is defined for concurrently displaying the received video streams based on the determined alignment reference heights. In some implementations, if the metadata associated with a received video stream does not specify any reference heights for aligning the images of the received video stream with images of other video streams, it may be determined that the upper and/or lower edges of the images of the received video stream are to be used to align the images of the video stream with images of other video streams.

In one specific example, the metadata associated with a first received video stream may specify an upper horizontal reference height that is displaced from the upper edge of images of the first video stream, while the metadata associated with a second received video stream may not specify an upper reference height or may specify that an upper edge of images of the second video stream should be used to align images of the second video stream with images from other video streams. In this example, a layout may be defined for concurrently displaying the first and second video streams that substantially aligns the upper reference height of images of the first video stream with the upper edge of images of the second video stream.

In another specific example, the metadata associated with a first received video stream may specify an upper horizontal reference height that is displaced from the upper edge of images of the first video stream and a lower horizontal reference height that is displaced from the lower edge of images of the first video stream, while the metadata associated with a second received video stream may not specify upper or lower reference heights or may specify that the upper and lower edges of images of the second video stream should be used to align images of the second video stream with images from other video streams. In this example, a layout may be defined for concurrently displaying the first and second video streams that substantially aligns the upper reference height of images of the first video stream with the upper edge of images of the second video stream and that substantially aligns the lower reference height of images of the first video stream with the lower edge of images of the second video stream.

Finally, at 310, the received video streams are displayed concurrently at the location according to the defined layout.

Figure 4:
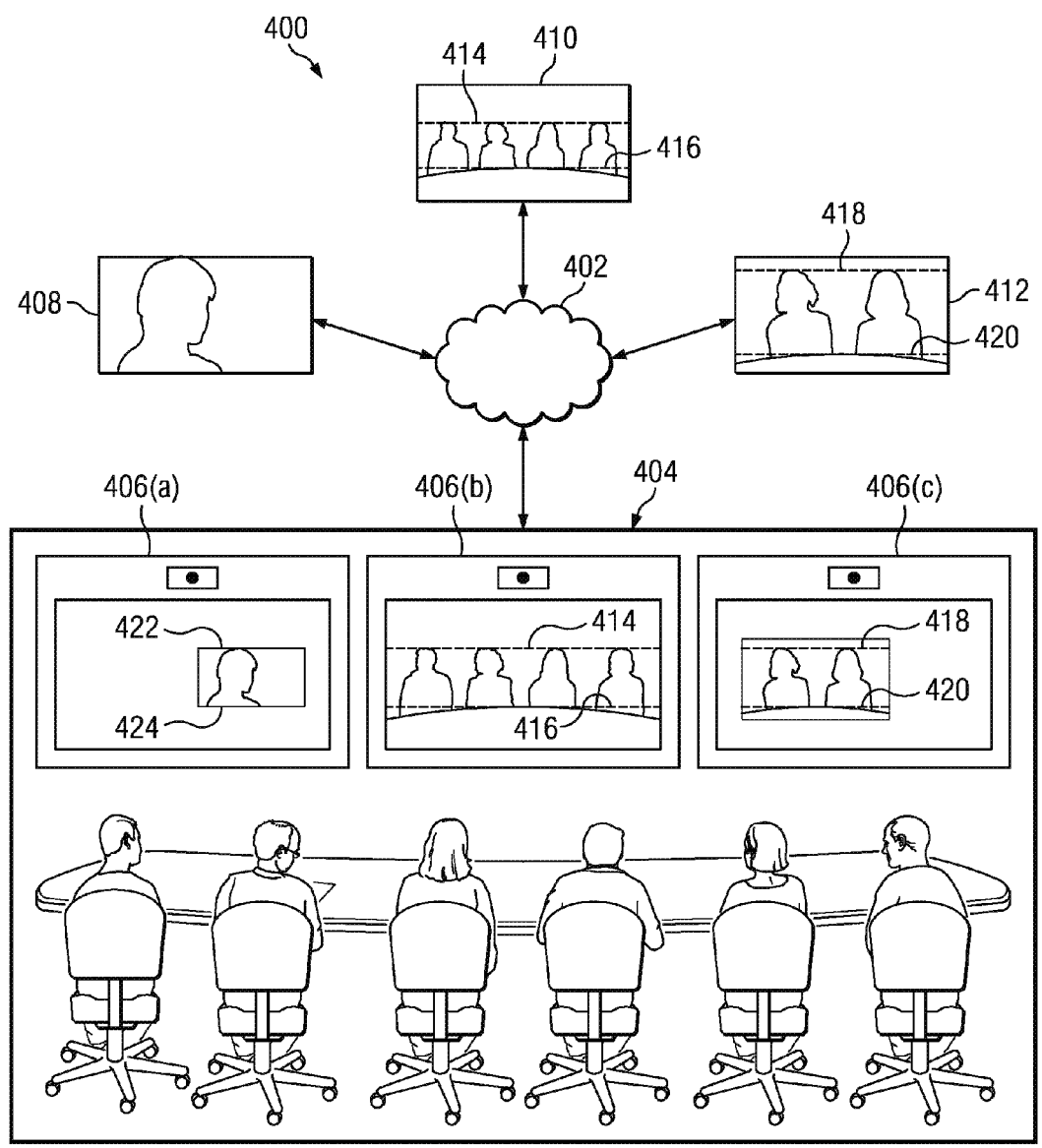

FIG. 4 is a schematic diagram of a multipoint videoconference 400. As illustrated in FIG. 4, the videoconference 400 includes participants participating in the videoconference 400 from four different locations via electronic devices that are communicatively coupled by a network 402. In the foreground, a first group of participants is shown participating in the videoconference 400 from a dedicated videoconference studio 404 having three display devices 406(a)-406(c) on which streams of video images of the other participants in the videoconference 400 are displayed. In addition, an individual participant is participating in the videoconference 400 from a first remote location 408 (e.g., using a webcam or similar relatively uncontrolled video camera), a second group of participants is participating in the videoconference 400 from a second remote location 410 (e.g., a dedicated videoconference studio similar to videoconference studio 404), and a third group of participants is participating in the videoconference 400 from a third remote location 412 (e.g., a dedicated videoconference studio similar to videoconference studio 404).

As illustrated in FIG. 4, display device 406(a) is displaying a stream of video images of the individual participant located at remote location 408, for example captured by a webcam or similar relatively uncontrolled video camera. Meanwhile, display device 406(b) is displaying streams of video images of the group of participants gathered at remote location 410, for example captured by controlled and relatively sophisticated video cameras, and display device 406(c) is displaying streams of video images of the group of participants gathered at remote location 412, for example captured by controlled and relatively sophisticated video cameras.

As further illustrated in FIG. 4, in the stream of video images of the participants at location 410, an upper alignment reference line 414 is established corresponding to an approximate head height of the participants, and a lower alignment reference line 416 is established corresponding to an approximate table height. Similarly, in the stream of video images of the participants at location 412, an upper alignment reference line 418 is established corresponding to an approximate head height of the participants, and a lower alignment reference line 420 is established corresponding to an approximate table height.

The alignment reference lines 414 and 416 established in the stream of video images of the participants at location 410 and the alignment reference lines 418 and 420 established in the stream of video images of the participants at location 412 may be used in defining a layout for concurrently displaying the video streams of the videoconference at dedicated videoconference studio 404. In particular, the video streams are displayed at dedicated videoconference studio 404 such that a top edge 422 of the video images of the stream of the individual participant located at location 408, the upper reference line 414 of the video images of the stream of the group of participants located at location 410, and the upper reference line 418 of the video images of the stream of the group of participants located at location 412 all are substantially aligned and such that a lower edge 424 of the video images of the stream of the individual participant located at location 408, the lower reference line 416 of the video images of the stream of the group of participants located at location 410, and the lower reference line 420 of the video images of the stream of the group of participants located at location 412 all are substantially aligned.

Thus far, the techniques for defining layouts for displaying images generally have been described in the context of displaying streams of video images (e.g., in connection with a videoconference). However, the techniques described herein may have more general applicability and can be used to define layouts for concurrently displaying any type of images, including, for example, still images.

FIG. 5 is a flowchart 500 that illustrates an example of a process for defining a layout for concurrently displaying multiple images (e.g., multiple still images) at a location. The process illustrated in the flowchart 500 of FIG. 5 may be performed by a computing system.

At 502, metadata associated with a first image to be displayed is accessed. Then, at 504, one or more alignment reference lines for aligning a display of the first image with other images are determined based on metadata associated with the first image.

Similarly, at 506, metadata associated with a second image to be displayed is accessed, and, at 508, one or more alignment reference lines for aligning a display of the second image with other images are determined based on metadata associated with the second image.

At 510, a layout for concurrently displaying the first and second images is defined based on the determined alignment reference lines. For example, a layout may be defined that substantially aligns the one or more alignment reference lines of the first image with the corresponding one or more alignment reference lines of the second image. Then, at 512, the first and second images are displayed concurrently at the location according to the defined layout.

A number of implementations have been described. However, additional implementations are within the scope of this disclosure. For example, although the techniques for defining layouts for concurrently displaying multiple images generally have been described in the context of using horizontal alignment reference lines (or heights) to align the images, vertically oriented reference lines also may be used to align images. Furthermore, although the techniques for defining layouts for concurrently displaying multiple images often have been described in the context of concurrently displaying images on multiple distinct display devices, the techniques may be used to define layouts for concurrently displaying multiple images on a single display device including, for example, a laptop computer display, a display device associated with a desktop computer, a television, etc.

A number of methods, techniques, systems, and apparatuses have been described. The described methods, techniques, systems, and apparatuses may be implemented in digital electronic circuitry or computer hardware, for example, by executing instructions stored in computer-readable storage media.

Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved. Similarly, components in the disclosed systems may be combined in a different manner and/or replaced or supplemented by other components and the desired results still may be achieved.

What is claimed is:

1. A method comprising:
   receiving, at a computing system, a first stream of video images corresponding to a videoconference;
   receiving, at the computing system, a second stream of video images corresponding to the videoconference that is different from the first stream of video images;
   accessing, by the computing system, metadata associated with the first stream of video images and specifying an upper alignment reference height and a lower alignment reference height within the video images of the first stream, wherein the upper alignment reference height is associated with an approximate head height of one or more videoconference participants within the video images;
   based on the accessed metadata specifying the upper alignment reference height and the lower alignment reference height within the video images of the first stream, defining, by the computing system, a layout for concurrently displaying the first stream of video images and the second stream of video images at a location that substantially aligns a top edge of the video images of the second stream with the upper alignment reference height within the video images of the first stream and that substantially aligns a bottom edge of the video images of the second stream with the lower alignment reference height within the video images of the first stream.

2. The method of claim 1 wherein:
   the metadata associated with the first stream of video further specifies an approximate height of a table edge within the video images of the first stream; and
   defining a layout for concurrently displaying the first stream of video images and the second stream of video images at a location that substantially aligns a top edge of the video images of the second stream with the upper alignment reference height within the video images of the first stream and that substantially aligns a bottom edge of the video images of the second stream with the lower alignment reference height within the video images of the first stream includes defining a layout for concurrently displaying the first stream of video images and the second stream of video images that substantially aligns a top edge of the video images of the second stream with the approximate head height of videoconference participants within the video images of the first stream and that substantially aligns a bottom edge of the video images of the second stream with the approximate height of the table edge within the video images of the second stream.

3. The method of claim 1 further comprising:
   accessing, by the computing system, metadata associated with the second stream of video images;
   determining, by the computing system and based on having accessed the metadata associated with the second stream of video images, that the metadata associated with the second stream of video images does not specify an upper alignment reference height or a lower alignment reference height within the video images of the second stream, wherein:
   defining the layout for concurrently displaying the first stream of video images and the second stream of video images at the location that substantially aligns the top edge of the video images of the second stream with the upper alignment reference height within the video images of the first stream and that substantially aligns the bottom edge of the video images of the second stream with the lower alignment reference height within the video images of the first stream includes defining the layout for concurrently displaying the first stream of video images and the second stream of video images at the location that substantially aligns the top edge of the video images of the second stream with the upper alignment reference height within the video images of the first stream and that substantially aligns the bottom edge of the video images of the second stream with the lower alignment reference height within the video images of the first stream as a consequence of having determined that the metadata associated with the second stream of video images does not specify an upper alignment reference height or a lower alignment reference height within the video images of the second stream.

4. The method of claim 1 wherein defining a layout for concurrently displaying the first stream of video images and the second stream of video images at the location that substantially aligns a top edge of the video images of the second stream with the upper alignment reference height within the video images of the first stream and that substantially aligns a bottom edge of the video images of the second stream with the lower alignment reference height within the video images of the first stream includes defining a layout for concurrently displaying the first stream of video images and the second stream of video images at the location within which a display size of the first stream of video images is different from a display size of the second stream of video images.

5. The method of claim 4 wherein:
receiving a first stream of video images includes receiving a first stream of video images having a defined aspect ratio;
receiving a second stream of video images includes receiving a second stream of video images having the same defined aspect ratio as the first stream of video images; and
defining a layout for concurrently displaying the first stream of video images and the second stream of video images at the location within which the display size of the first stream of video images is different from the display size of the second stream of video images includes defining a layout for concurrently displaying the first stream of video images and the second stream of video images at the location within which a display aspect ratio of the first stream of video images and a display aspect ratio of the second stream of video images are the same as the defined aspect ratio.

6. The method of claim 1 wherein:
receiving a first stream of video images includes receiving a first stream of video images having a first defined aspect ratio;
receiving a second stream of video images includes receiving a second stream of video images having a second defined aspect ratio that is different than the defined aspect ratio of the first stream of video images; and
defining a layout for concurrently displaying the first stream of video images and the second stream of video images at the location that substantially aligns a top edge of the video images of the second stream with the upper alignment reference height within the video images of the first stream and that substantially aligns a bottom edge of the video images of the second stream with the lower alignment reference height within the video images of the first stream includes defining a layout for concurrently displaying the first stream of video images and the second stream of video images at the location within which a display scale of the first stream of video images is different than a display scale of the second stream of video images and within which a display aspect ratio of the first stream of video images is the same as the defined aspect ratio of the first stream of video images and a display aspect ratio of the second stream of video images is the same as the defined aspect ratio of the second stream of video images.

7. The method of claim 1 wherein defining a layout for concurrently displaying the first stream of video images and the second stream of video images at a location that substantially aligns a top edge of the video images of the second stream with the upper alignment reference height within the video images of the first stream and that substantially aligns a bottom edge of the video images of the second stream with the lower alignment reference height within the video images of the first stream includes defining a layout for displaying the first stream of video images on a first display device at the location such that the first stream of video images occupies substantially all of the display area of the first display device and displaying the second stream of video images on a second display device at the location that is the same size as the first display device and that is positioned such that a top of the first display device is substantially aligned with a top of the second display device and a bottom of the first display device is substantially aligned with a bottom of the second display device and according to which the first stream of video images is displayed on the first display device and the second stream of video images is displayed on the second display device such that a top edge of the video images of the second stream displayed on the second display device is substantially aligned with the upper alignment reference height within the video images of the first stream displayed on the first display device and such that a bottom edge of the video images of the second stream displayed on the second display device is substantially aligned with the lower alignment reference height within the video images of the first stream displayed on the first display device.

8. The method of claim 7 wherein defining a layout for displaying the first stream of video images on the first display device at the location and displaying the second stream of video images on the second display device at the location includes defining a layout for displaying the first stream of video images on the first display device at the location and displaying the second stream of video images on the second display device at the location according to which the second stream of video images is displayed off-center of the second display device and horizontally biased toward the first display device.

9. The method of claim 1 wherein the computing system is a hosted computing system that is remote from the location.

10. The method of claim 1 wherein:
the computing system is a personal computing system associated with a display device; and
defining a layout for concurrently displaying the first stream of video images and the second stream of video images at a location that substantially aligns a top edge of the video images of the second stream with the upper alignment reference height within the video images of the first stream and that substantially aligns a bottom edge of the video images of the second stream with the lower alignment reference height within the video images of the first stream includes defining a layout for concurrently displaying the first stream of video images and the second stream of video images on the display device associated with the personal computing system such that a top edge of the video images of the second stream is substantially aligned with the upper alignment reference height within the video images of the first stream and a bottom edge of the video images of the second stream is substantially aligned with the lower alignment reference height within the video images of the first stream.

11. The method of claim 1 wherein the computing system is located at the location.

12. The method of claim 1 further comprising concurrently displaying the first stream of video images and the second stream of video images on one or more display devices at the location according to the defined layout such that the top edge of the video images of the second stream is substantially aligned with the upper alignment reference height within the video images of the first stream and the bottom edge of the video images of the second stream is substantially aligned with the lower alignment reference height within the video images of the first stream.

13. A non-transitory computer-readable storage medium storing instructions that, when executed by a computing system, cause the computing system to:
access metadata associated with a first image that specifies a first alignment reference line for the first image that is parallel to but displaced from an edge of the first image, wherein the first alignment reference line corresponds to an approximate head height of one or more videoconference participants within the first image;

access metadata associated with a second image that specifies a second alignment reference line for the second image that is parallel to but displaced from an edge of the second image; and based on the accessed metadata associated with the first image and the accessed metadata associated with the second image, define a layout for concurrently displaying the first image and the second image at a location that substantially aligns the first alignment reference line for the first image with the second alignment reference line for the second image.

14. A system comprising:

one or more processing elements; and a computer memory system storing instructions that, when executed by the one or more processing elements, cause the one or more processing elements to:

access metadata associated with a first image that specifies an alignment reference line for the first image that is parallel to but displaced from an edge of the first image, wherein the alignment reference line for the first image corresponds to an approximate head height of one or more videoconference participants within the first image;

access metadata associated with a second image;

determine, based on the accessed metadata associated with the second image, to use a particular edge of the second image as an alignment reference line for the second image; and based on the accessed metadata associated with the first image and the determination to use the particular edge of the second image as an alignment reference line for the second image, define a layout for concurrently displaying the first image and the second image at a location that substantially aligns the first alignment reference line for the first image with the particular edge of the second image.

15. The system of claim 14 wherein the particular edge of the second image corresponds to an approximate head height of at least one videoconference participant within the second image.

16. The system of claim 14 wherein the accessed metadata associated with the first image further specifies a second alignment reference line for the first image that corresponds to an approximate height of a table edge within the first image.

17. The non-transitory computer-readable storage medium of claim 13, wherein the second alignment reference line corresponds to an approximate head height of one or more videoconference participants within the second image.

18. The non-transitory computer-readable storage medium of claim 13, wherein the accessed metadata associated with the first image further specified a third alignment reference line that corresponds to an approximate height of a first table edge within the first image, and wherein the accessed metadata associated with the second image further specified a fourth alignment reference line that corresponds to an approximate height of a second table edge within the second image.

* * * * *

UNITED STATES PATENT AND TRADEMARK OFFICE
CERTIFICATE OF CORRECTION

PATENT NO. : 9,445,052 B2
APPLICATION NO. : 13/222429
DATED : September 13, 2016
INVENTOR(S) : Mark E. Gorzynski et al.

It is certified that error appears in the above-identified patent and that said Letters Patent is hereby corrected as shown below:

In the Claims

In Column 14, Line 25, in Claim 18, delete "specified" and insert -- specifies --, therefor.

In Column 14, Line 29, in Claim 18, delete "specified" and insert -- specifies --, therefor.

Signed and Sealed this
Thirteenth Day of March, 2018

Andrei Iancu
*Director of the United States Patent and Trademark Office*